United States Patent [19]
Wingo

[11] Patent Number: 5,796,884
[45] Date of Patent: *Aug. 18, 1998

[54] OPTICAL CROSS CONNECT DEVICE

[75] Inventor: Dale T. Wingo, Richardson, Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 673,631

[22] Filed: Jun. 26, 1996

[51] Int. Cl.$^6$ .................................. G02B 6/35
[52] U.S. Cl. .................. 385/16; 385/17; 385/50
[58] Field of Search ................ 385/15–23, 39, 385/50, 52

[56] References Cited

U.S. PATENT DOCUMENTS

| | | | |
|---|---|---|---|
| 3,526,880 | 9/1970 | Filippazzi | 385/17 X |
| 4,749,258 | 6/1988 | Baker | 385/16 X |
| 4,915,486 | 4/1990 | Hansen | 385/16 X |
| 5,307,438 | 4/1994 | Bilkadi et al. | 385/15 X |

FOREIGN PATENT DOCUMENTS 0320251  6/1989  European Pat. Off. ........... 385/17

Primary Examiner—John D. Lee

[57] ABSTRACT

An optical cross connect device for switching light signals including a plurality of first optical fiber light guides positioned substantially parallel to each other. Each of the first optical fiber light guides includes a core and cladding, and each of the first optical fiber light guides has formed therein a plurality of linearly spaced apart notches through the cladding to expose the core. A plurality of substantially parallel second optical fiber light guides having cores and cladding, and being notched in similar fashion to the first optical fiber guides, are engaged with the first optical fiber guides to form a plurality of junctions. Each of said junctions normally forms a discontinuity of refractive indices and absorption with the cores of the first and second optical fiber light guides. The discontinuity of refractive indices is removable at a selected junction, thereby to permit light signals to pass from one of the first optical fiber light guides to one of the second optical fiber light guides across the selected junction.

18 Claims, 4 Drawing Sheets

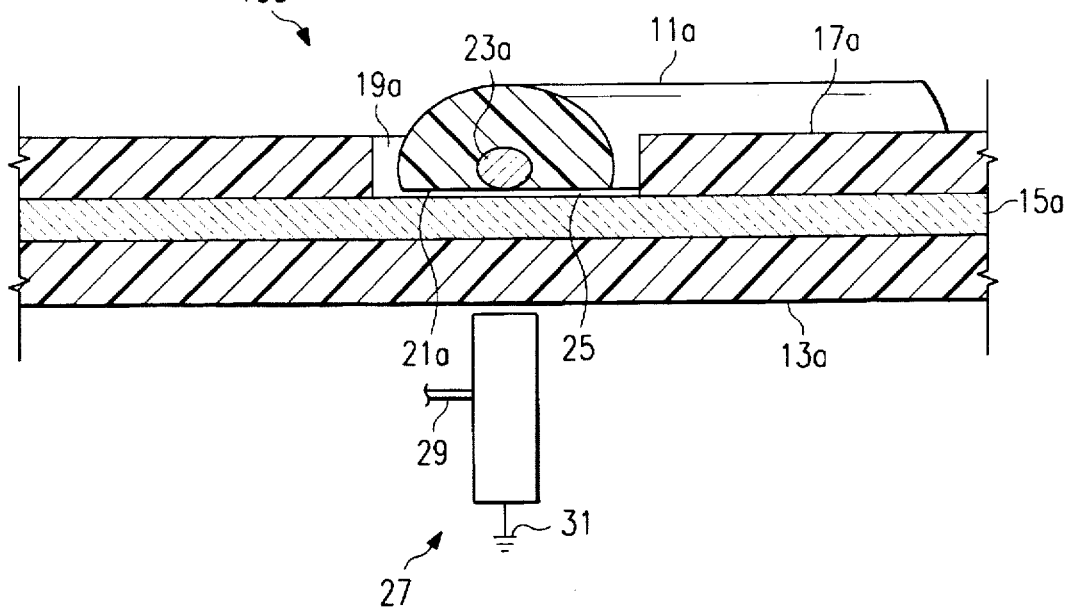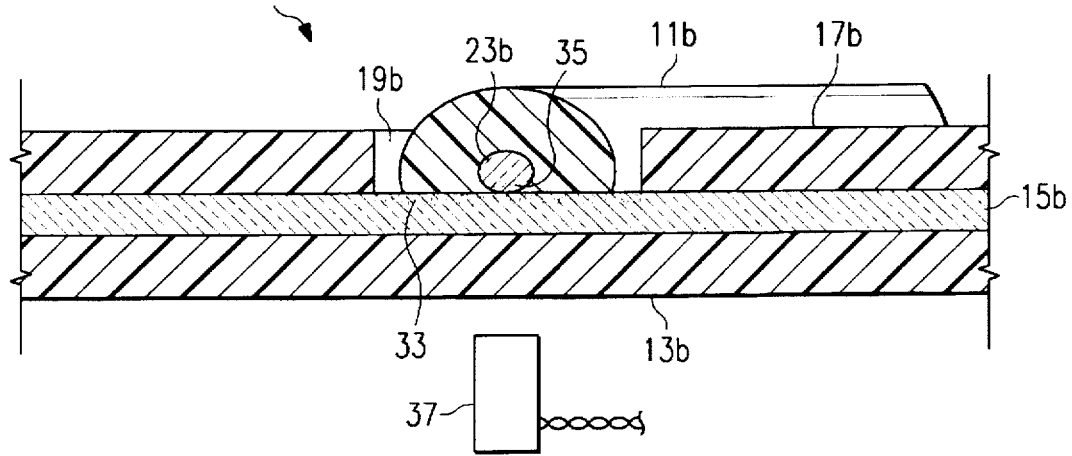

OPTICAL CROSS CONNECT DEVICE

FIELD OF THE INVENTION

The present invention relates generally to telecommunications switching devices and more particularly to an optical switching device for switching light signals directly from a first optical fiber light guide to a second optical fiber light guide.

DESCRIPTION OF THE PRIOR ART

Optical fiber light guides, or fiber-optic cables, provide a medium for communication by transmitting signals with light rather than electricity. There are a number of advantages of fiber-optic communication over electrical communication. Since fiber-optic communication uses light, transmissions are not subject to electrical interference. Also, light signals in fiber-optic cables encounter very little resistance, as compared to electrical signals over wires. Therefore, fiber-optic cable can be used to transmit over much longer distances before the signal needs to be retimed, reshaped, and amplified.

Another advantage of fiber-optic communications is bandwidth. In principle, data can be transmitted fiber-optically many times faster than with electrical methods, with speeds up to terabits per second being possible. Presently, however, speeds are limited by the electrical transmission and reception equipment necessary to interface to the fiber-optic cable.

The major components of a fiber-optic fiber are a core and cladding, which form a dielectric light guide, and a mechanical buffer, strength member, and jacket, which provide strength and durability to the cable. The core is a glass or plastic fiber through which the light signal travels. The diameter of the core ranges from less than 8 microns, for single mode fiber, to 60–100 microns, for multimode fiber. In single mode fiber, the light takes only a single path through the core. Single mode fiber provides less signal distortion and attenuation than multimode fiber and provides higher transmission speeds; however, it is much more expensive and difficult to work with than multimode fiber. In multimode fiber, the light signal can follow any of several paths through the core, which results in signal distortion and loss, but it is less expensive and easier to work with. Therefore, multimode fiber is preferred in certain short haul applications.

The cladding is a protective layer, usually made of plastic coated glass, with an index of refraction lower than that of the core. The difference in refractive index at the boundary between the core and cladding causes the light signal to undergo internal reflection and be guided in the core. The core and cladding are manufactured to international specifications as a unit and they form a cylinder with a diameter in the 125–140 micron range, depending on use.

In addition to the cable itself, a fiber-optic communication system includes a transmitter and a receiver. The transmitter converts an electrical signal into light pulses and sends the light into the core of the fiber. The transmitter includes a modulator and light source. The light source is typically a laser. The receiver includes a photodetector, which converts the light signal to an electrical signal, an amplifier, and a processor, which reproduces the original electrical signal.

For all its advantages over electrical transmission, fiber-optic communications has certain shortcomings. One shortcoming is that switching electrically is limited in bandwidth to semiconductor technology. A fiber-optic system would be able to switch the light signals, which can be carrying terahertz information, regardless of the limitations of semiconductor technology. However, the current inability to switch more than a few light signals makes optical switching very expensive. Electrical switching and wavelength division multiplexing are not satisfactory due to the need to change wavelength of the optical transmitter every time the routing is changed.

SUMMARY OF THE INVENTION

In one of its aspects, the present invention provides an optical switch. The optical switch of the present invention includes a first optical fiber light guide and a second optical fiber light guide. Each of the optical fiber light guides includes a core and cladding, and each has formed therein a notch through its cladding to expose the core. The first and second optical fiber light guides are engaged with each other at their respective notches to form a junction. The junction forms a discontinuity of refractive indices between the cores of the first and second optical fiber light guides, so that light travelling in one light guide cannot cross the junction to the other light guide. Switching is performed by selectively removing the discontinuity of refractive indices, thereby to permit light signals to pass from one first optical fiber light guide to the other across the junction.

In one embodiment of the optical switch of the present invention, the cores are normally spaced apart, so that the discontinuity of refractive indices is formed by a gap of greater than one wavelength between the cores. The discontinuity of refractive indices is removed by moving the cores into closer proximity with each other at the junction. In another embodiment of the optical switch of the present invention the discontinuity of refractive indices is formed by a layer of material at the junction having an index of refraction different from that of the cores. The discontinuity of refractive indices is removed by changing the index of refraction of the material in any of several ways to that of the cores.

In another of its aspects, the present invention provides an optical cross connect by forming an array of optical switches. The array is formed by positioning a first plurality of light guides substantially parallel to each other and then forming, by gang grinding or the like, therein a plurality of linearly spaced apart notches through the cladding to expose the core. A second plurality of light guides is positioned and notched in substantially the same way and then engaged with the first plurality to form a plurality of junctions.

BRIEF DESCRIPTION OF THE DRAWINGS

FIG. 3 is a detail view of a junction according to one embodiment of the optical switch of the present invention.

FIG. 4 is a detail view of a junction according to a second embodiment of the optical switch of the present invention.

DESCRIPTION OF THE PREFERRED EMBODIMENT

Figure 1:
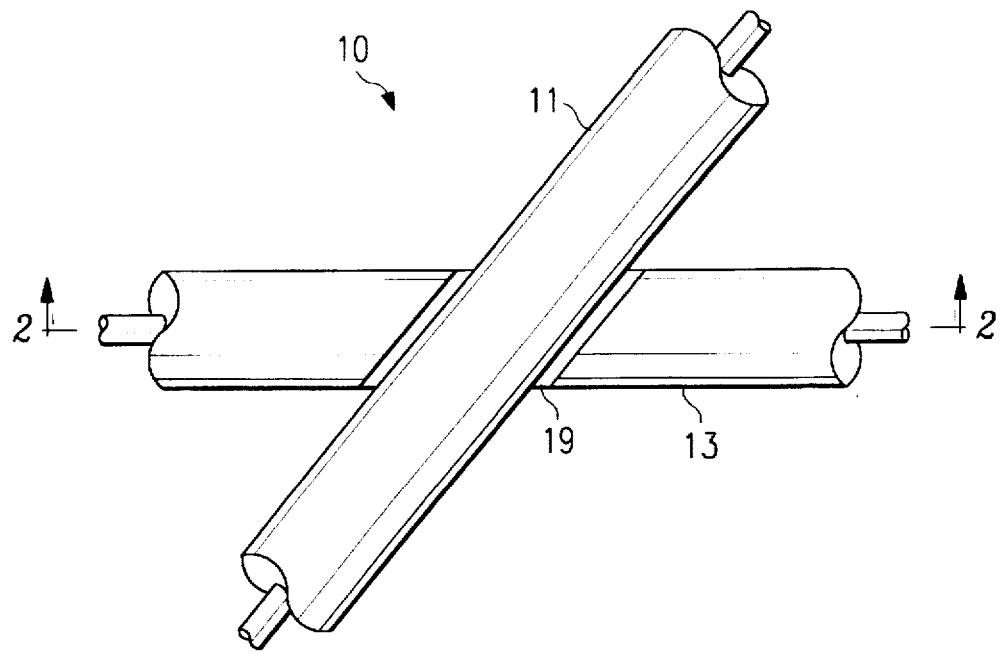
FIG. 1 is a top view of a pair of optical fiber light guides forming a junction according to the present invention.
Figure 2:
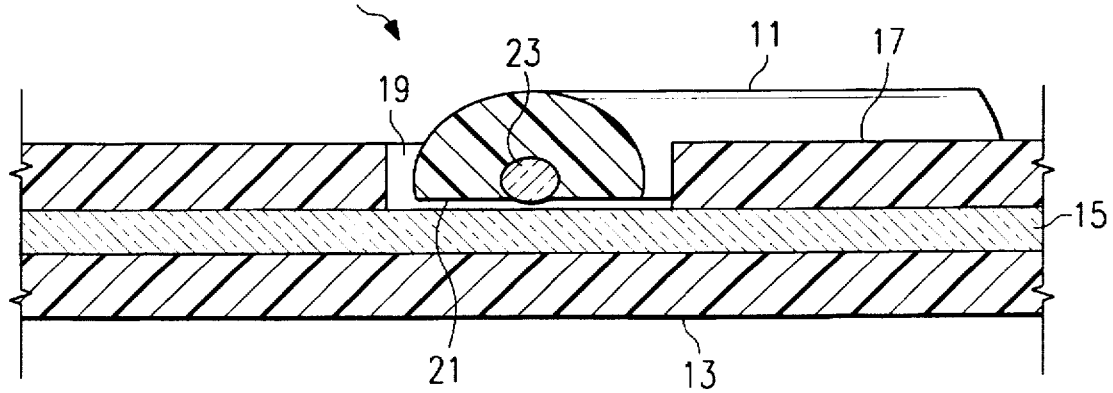
FIG. 2 is a sectional view taken along line 2—2 of FIG. 1.

Referring now to the drawings, and first to FIGS. 1 and 2, an optical junction is designated generally by the numeral 10. Junction 10 is formed at the intersection of a first optical fiber light guide 11 and a similarly constructed second optical fiber light guide 13 at a non-ninety degree angle appropriate to the band of wavelengths of light being used. Referring to FIG. 2, light guide 13 includes a an optical fiber core 15 covered by a cladding 17. In the preferred embodiment, light guides 11 and 13 are single mode. Therefore, light guide 13 has a core diameter of about eight microns and an overall diameter of about 125 microns.

Light guide 13 has a notch 19 through cladding 17 to expose its core 15. Light guide 11 has a similar notch 21 that exposes its core 23. Junction 10 is formed by engaging notches 19 and 21 to put cores 15 and 23 in close proximity with each other. However, as will be explained in greater detail, light signals traveling through light guide 11 cannot normally pass to light guide 13 due to a discontinuity in index of refraction between core 15 and 23 across junction 10.

Referring now to FIG. 3, there is shown a detail view of a junction 10a etween light guides 11a and 13a according to one embodiment of the present invention. Cores 23a and 15a are exposed in respective notches 21a and 19a, but in the embodiment of FIG. 3 they are normally spaced apart by a gap 25 that is preferably greater than one wavelength. Gap 25 has an index of refraction lower than that of cores 15a and 23a and thus forms a reflective discontinuity. Therefore, light signals traveling in cores 15a and 23a past their respective notches undergo internal reflection and do not pass from one core to the other.

According to the present invention, switching is accomplished by removing the discontinuity of refractive indices. In the embodiment of FIG. 3, the discontinuity is removed by mechanically closing gap 25 with an actuator, designated generally by the numeral 27, suitably mounted to apply a force to light guide 13a. Preferably, actuator 27 is formed of a piezoelectric material, such as barium titanate, although other electrical, mechanical, or fluid operated actuators may be used. Selective application of a voltage to actuator 27 between a lead 29 and ground 31 will cause actuator 27 to elongate and force core 15a into intimate contact with core 23a. When cores 23a and 15a are in such intimate contact the index of refraction at their junction is matched and light can pass across junction 10a. The junction may be immersed in various gases or liquids.

Referring now to FIG. 4, there is shown an alternative embodiment of the present invention. A junction 10b is formed between light guides 11b and 13b. In junction 10b, cores 15b and 23b are normally in intimate contact with each other. In order to form a discontinuity of index of refraction across junction 10b, cores 15b and 23b that are exposed in their respective notches are doped with a material, such as erbium. There erbium doping forms layers 33 and 35 in cores 15b and 23b, respectively, of a material having an absorption and an index of refraction different from that of the undoped glass of the cores. Thus, the erbium doping forms a discontinuity of index of refraction and absorption across junction 10b.

The erbium doped glass at junction 10b has the property that it is photo-bleachable, such that exposure to certain wavelengths of light in certain intensities will cause the erbium doped glass to match the refractive index of undoped glass and decrease its absorption to a negative number.

Therefore, in the embodiment of FIG. 4, a light source 37 is suitably mounted to shine light on junction 10b. Selective illumination of junction 10b with light source 37 matches the index of refraction and allows light signals to pass across junction 10b. Preferably, light source 37 is a laser or a latching light source and a silicon mirror.

Figure 5:
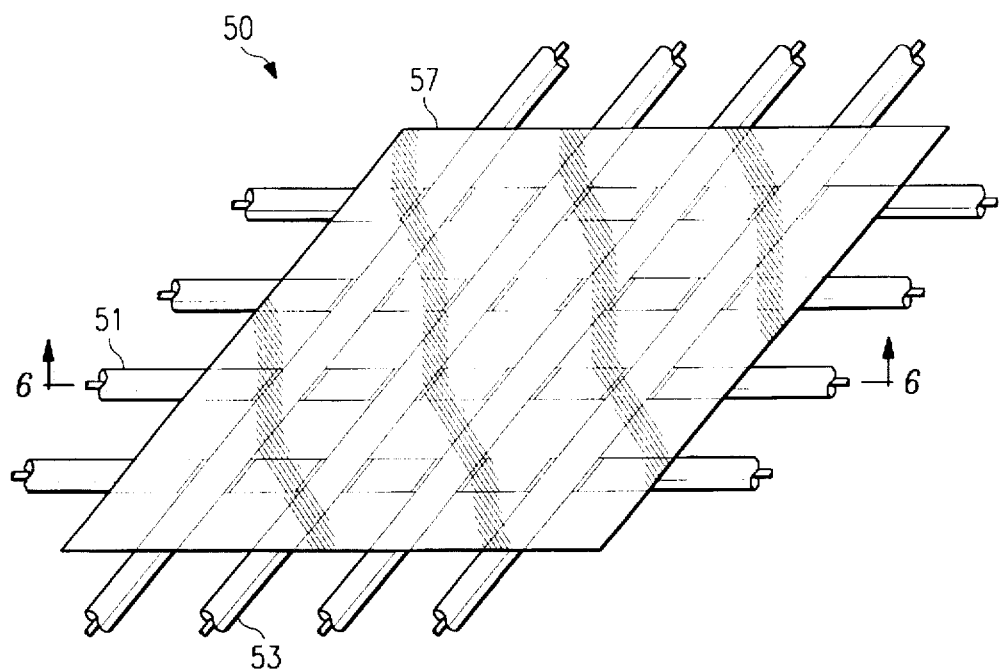
FIG. 5 is a top view of an optical cross connect according to one embodiment of the present invention.
Figure 6:
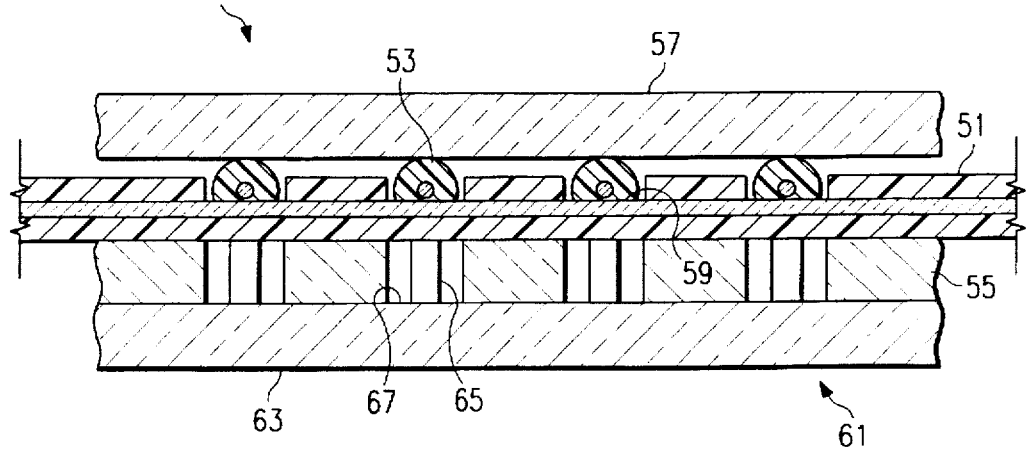
FIG. 6 is a sectional view taken along line 6—6 of FIG. 5.

Referring now to FIGS. 5 and 6, there is illustrated an optical cross connect 50 according to one embodiment of the present invention. Cross connect 50 is generally an array of optical switches of the type shown in FIG. 3. Cross connect 50 includes a plurality of first light guides, including a light guide 51, and a plurality of second light guides, including a light guide 53.

The first light guides are mounted with epoxy or the like substantially parallel to light guide 51 on a first substrate 55. First substrate 55 provides a flat surface and it is preferably made of low thermal expansion glass. After the first light guides have been mounted to first substrate 55, the first light guides are notched to expose their cores, preferably by making a plurality of substantially parallel cuts with ganged diamond saws across the first light guides. Diamond sawing techniques down to the micron level are well known to those skilled in the semiconductor fabrication art.

Similarly, the second light guides are mounted with epoxy or the like substantially parallel to light guide 53 on a glass substrate 57. Again, after the second light guides have been mounted to second substrate 57, the second light guides are notched by making a plurality of substantially parallel cuts with ganged diamond saws to expose their cores. Then, first substrate 55 and second substrate 57 with their light guides mounted thereto are affixed to each other form a plurality of junctions, including a junction 59. Cross connect 50 of FIGS. 5 and 6 is illustrated as having four first light guides and four second light guides. Thus, cross connect 50 has sixteen junctions. Those skilled in the art will recognize that the cross connect of the present invention may be made as large as desired by mounting virtually any number of light guides on the substrate at any desired spacing.

In the embodiment of FIGS. 5 and 6, the refractive index and absorption discontinuity is formed by gaps at the junctions. In order to switch selectively from any first light guide to any second light guide, cross connect 50 includes an array of selectively actuatable piezoelectric actuators, designated generally by the numeral 61. Actuator array 61 includes a base plate 63 having mounted thereon plurality of actuators, including an actuator 65, that act as pistons or plungers. Each actuator passes through a hole 67 in first substrate 55 to engage a junction 59 where it is operable to close the gap at the junction 59.

Figure 7:
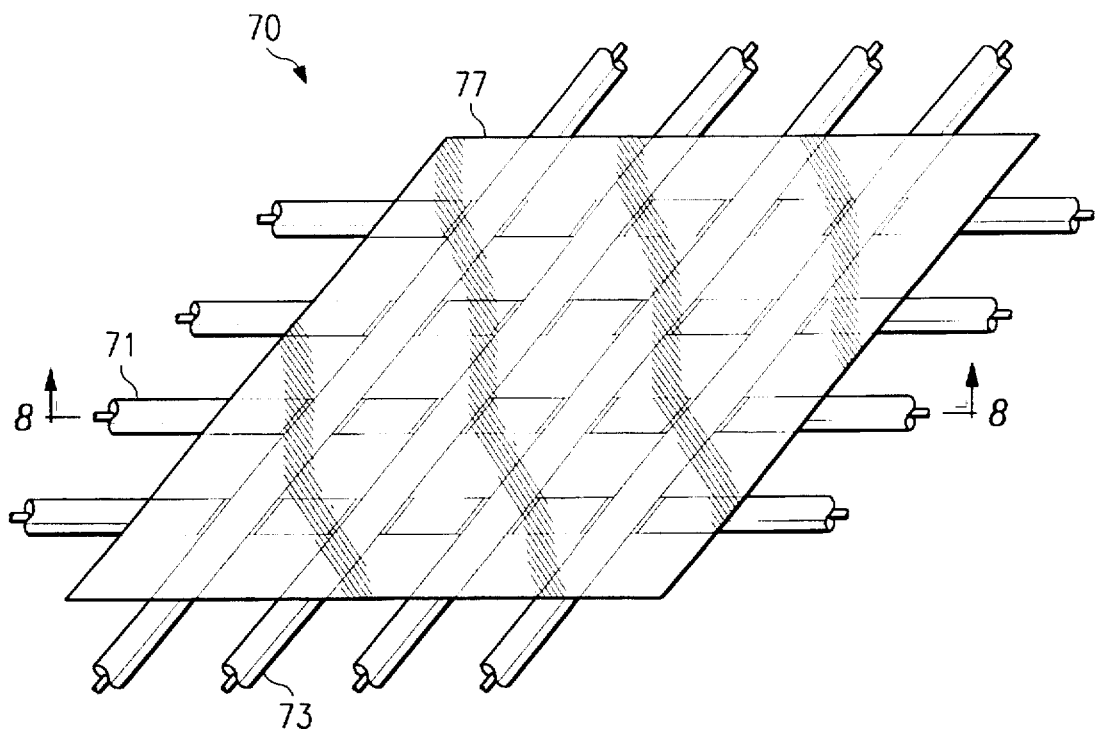
FIG. 7 is a top view of an optical cross connect according to a second embodiment of the present invention.
Figure 8:
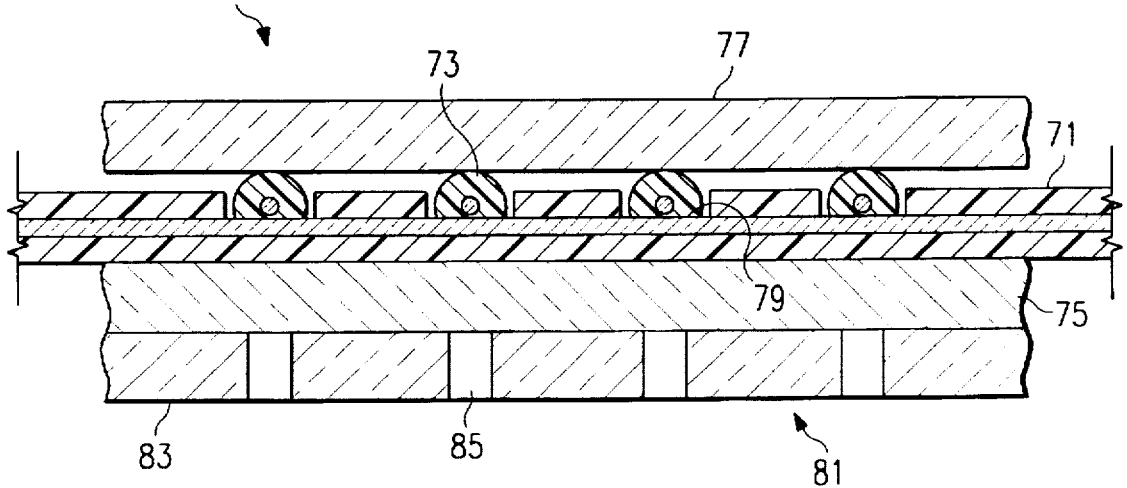
FIG. 8 is a sectional view taken along line 8—8 of FIG. 7.

Referring now to FIGS. 7 and 8, an alternative embodiment of the cross connect of the present invention is designated generally by the numeral 70. Cross connect 70 is generally an array of optical switches of the type shown in FIG. 4. Cross connect 70 is constructed in a manner similar to cross connect 50 of FIGS. 5 and 6 and it includes a plurality of first light guides, including a light guide 71, and a plurality of second light guides, including a light guide 73. The first light guides are mounted with epoxy or the like substantially parallel to light guide 71 on a glass first substrate 75. After the first light guides have been mounted to first substrate 75, the first light guides are notched to expose their cores by making a plurality of substantially parallel diamond saw cuts across the first light guides.

Similarly, the second light guides are mounted with epoxy or the like substantially parallel to light guide 73 on a glass substrate 77. Again, after the second light guides have been mounted to second substrate 77, the second light guides are notched by making a plurality of substantially parallel diamond saw cuts to expose their cores. Then, first substrate 75 and second substrate 77 with their light guides mounted thereto are affixed to each other form a plurality of junctions, including a junction 79.

In the embodiment of FIGS. 7 and 8, the refractive index discontinuity is formed by photo-bleachable doping at the junctions. In order to switch selectively from any first light guide to any second light guide, cross connect 70 includes an array of selectively actuatable and latchable light sources, designated generally by the numeral 81, mounted to first substrate 75. Light source array 81 includes a base plate 83 having mounted thereon plurality of light sources, including a light source 85. Since first substrate 75 is glass, the light sources of array 81 can shine through first substrate 75 to illuminate selected junctions. Array 81 may comprise a commercially available vertical cavity surface-emitting laser array. Alternatively, array 81 may comprise a commercially available micromirror array with a suitable light source.

Although preferred embodiments of the present invention have been described in detail, those skilled in the art will recognize that various geometrical alternatives and electrical thermochromic modifications thereof are within the spirit and scope of the invention as set forth in the appended claims.

What is claimed is:

1. An optical switch, which comprises:

a first optical fiber light guide, said first optical fiber light guide including a core and cladding, said first optical fiber light guide having formed therein a notch through said cladding to expose said core;

a second optical fiber light guide, said second optical fiber light guide including a core and cladding, said second optical fiber light guide having formed therein a notch through said cladding to expose said core, said first and second optical fiber light guides being engaged with each other at their respective notches to form a junction;

a layer of material at said junction, said material having an index of refraction different from that of said cores and being able to change to an index of refraction matching said index of refraction of said cores; and means for matching said index of refraction of said material to that of said cores, thereby to permit light signals to pass from said first optical fiber light guide to said second optical fiber light guide across said junction.

2. The optical switch as claimed in claim 1, wherein said material is a photo-bleachable material, and said means for matching said index of refraction of said material to that of said cores includes a light source positioned adjacent said junction and operable to bleach said photo-bleachable material.

3. The optical switch as claimed in claim 2, wherein said cores are in contact with each other and said layer of photo-bleachable material is formed by doping at least one of said cores with erbium.

4. An optical cross connect, which comprises:

a plurality of first optical fiber light guides positioned substantially parallel to each other, each of said first optical fiber light guides including a core and cladding, and each of said first optical fiber light guides having formed therein a plurality of linearly spaced apart notches through said cladding to expose said core;

a plurality of second optical fiber light guides, each of said second optical fiber light guides including a core and cladding, and each of said second optical fiber light guides having formed therein a plurality of linearly spaced apart notches through said cladding to expose said core, said first and second optical fiber light guides being engaged with each other at their respective notches to form a plurality of junctions;

a layer of material at said junctions, said material having an index of refraction different from that of said cores and being able to change to an index of refraction matching said index of refraction of said cores; and means for selectively matching said index of refraction of said material to that of said cores, thereby to permit light signals to pass from one of said first optical fiber light guides to one of said second optical fiber light guides across a selected junction.

5. The optical cross connect as claimed in claim 4, wherein said material is a photo-bleachable material, and said means for matching said index of refraction of said material to that of said cores includes a light source positioned adjacent to said selected junction and operable to bleach said photo-bleachable material.

6. The optical cross connect as claimed in claim 5, wherein said cores are in contact with each other at each junction and said layer of photo-bleachable material is formed by doping at least one of said cores with erbium.

7. The optical cross connect as claimed in claim 4, wherein said material is a photo-bleachable material, and said means for matching said index of refraction of said material to that of said cores includes an array of light sources, wherein each light source of said array is positioned adjacent one junction and operable to bleach said photo-bleachable material.

8. A method of making an optical cross connect, which comprises the steps of:

mounting a plurality of first optical fiber light guides positioned substantially parallel to each other on a first substrate, each of said first optical fiber light guides including a core and cladding;

making a plurality of substantially parallel cuts across said mounted first optical fiber light guides to form a plurality of linearly spaced apart notches through said cladding of each of said first optical fiber light guides to expose said cores;

mounting a plurality of second optical fiber light guides positioned substantially parallel to each other on a second substrate, each of said second optical fiber light guides including a core and cladding;

making a plurality of substantially parallel cuts across said mounted second optical fiber light guides to form a plurality of linearly spaced apart notches through said cladding of each of said second optical fiber light guides to expose said cores;

making a layer of material between said first and second optical fiber light guides with a different index of refraction of said cores of said first and second optical fiber light guides and capable of changing to said index of refraction of said cores; and engaging said mounted first and second optical fiber light guides with each other at their respective notches to form a plurality of junctions.

9. The method as claimed in claim 8, including the step of:

forming a discontinuity of refractive indices of said cores of said first and second optical fiber light guides at each of said junctions.

10. The method as claimed in claim 9, wherein said step of forming a discontinuity of refractive indices of said cores of said first and second optical fiber light guides at each of said junctions includes the step of:

forming a gap between said cores at each junction.

11. The method as claimed in claim 10, including the step of:

mounting an array of piezoelectric devices adjacent one of said substrates, wherein each piezoelectric device of said array is adapted to urge one of said optical fiber light guides toward the other at a junction.

12. The method as claimed in claim 8, including the step of:

forming a layer of material at each junction, said material having an index of refraction different from that of said cores.

13. The method as claimed in claim 12, wherein said step of forming a layer of material having a different index of refraction at each junction includes the step of doping the cores at each junction with a photo-bleachable material.

14. The method as claimed in claim 13, wherein said photo-bleachable material includes erbium.

15. The method as claimed in claim 13, including the step of:

mounting an array of light sources adjacent one of said substrates, wherein each light source of said array is positioned adjacent one junction and is operable to bleach said photo-bleachable material.

16. An optical switch, which comprises:

a first optical fiber light guide, said first optical fiber light guide including a core and cladding, said first optical fiber light guide having formed therein a notch through said cladding to expose said core;

a second optical fiber light guide, said second optical fiber light guide including a core and cladding, said second optical fiber light guide having formed therein a notch through said cladding to expose said core, said first and second optical fiber light guides being engaged with each other at their respective notches to form a junction;

a layer of photo-bleachable material forming a discontinuity of refractive indices of said cores of said first and second optical fiber light guides at said junction, and;

a light source positioned adjacent said junction and operable to bleach said photo-bleachable material to remove the discontinuity of refractive indices, thereby to permit light signals to pass from said first optical fiber light guide to said second optical fiber light guide across said junction.

17. An optical cross connect, which comprises:

a plurality of first optical fiber light guides positioned substantially parallel to each other, each of said first optical fiber light guides including a core and cladding, and each of said first optical fiber light guides having formed therein a plurality of linearly spaced apart notches through said cladding to expose said core;

a plurality of second optical fiber light guides, each of said second optical fiber light guides including a core and cladding, and each of said second optical fiber light guides having formed therein a plurality of linearly spaced apart notches through said cladding to expose said core, said first and second optical fiber light guides being engaged with each other at their respective notches to form a plurality of junctions;

a layer of photo-bleachable material at each of said junctions forming a discontinuity of refractive indices of said cores of said first and second optical fiber light guides, and;

a light source positioned adjacent each said junction, each light source being selectively operable to bleach said photo-bleachable material to selectively remove the discontinuity of refractive indices at a selected junction, thereby to permit light signals to pass from one of said first optical fiber light guides to one of said second optical fiber light guides across said selected junction.

18. A method of making an optical cross connect, which comprises the steps of:

mounting a plurality of first optical fiber light guides positioned substantially parallel to each other on a first substrate, each of said first optical fiber light guides including a core and cladding;

forming in each of said first optical fiber light guides a plurality of linearly spaced apart notches through said cladding to expose said core;

mounting a plurality of second optical fiber light guides positioned substantially parallel to each other on a second substrate, each of said second optical fiber light guides including a core and cladding;

forming in each of said second optical fiber light guides a plurality of linearly spaced apart notches through said cladding to expose said core; and, doping the exposed cores said first and second optical fiber light guides with a photo-bleachable material;

engaging said mounted first and second optical fiber light guides with each other at their respective notches to form a plurality of junctions.

* * * * *